United States Patent [19]
Limerkens et al.

[11] Patent Number: 5,840,782
[45] Date of Patent: Nov. 24, 1998

[54] REACTION SYSTEM FOR PREPARING MICROCELLULAR ELASTOMERS

[75] Inventors: Dominicus Limerkens, Meeuwen-Gruitrode; Christopher Phanopoulos, Tervuren; Johan Mietje Jozef Indesteege, Mol, all of Belgium

[73] Assignee: Imperial Chemical Industries PLC, London, England

[21] Appl. No.: 526,123

[22] Filed: Sep. 8, 1995

Related U.S. Application Data

[63] Continuation of Ser. No. 93,245, Jul. 16, 1993, abandoned.

[30] Foreign Application Priority Data

Aug. 5, 1992 [GB] United Kingdom .................. 9216631

[51] Int. Cl.$^6$ .................................................. C08G 18/00
[52] U.S. Cl. .......................... 521/174; 521/155; 521/159; 528/48; 528/65; 528/66; 528/76; 528/85; 264/54; 264/232; 264/239; 264/297.2
[58] Field of Search ..................................... 521/174, 155, 521/159; 528/48, 65, 66, 76, 85; 264/54, 232, 239, 297.2

[56] References Cited

U.S. PATENT DOCUMENTS

| | | | |
|---|---|---|---|
| 3,883,571 | 5/1975 | Allport et al. | 260/453 |
| 4,190,711 | 2/1980 | Zdrahala et al. | 521/112 |
| 4,229,347 | 10/1980 | Holt et al. | 260/239 |
| 4,374,210 | 2/1983 | Ewen et al. | 521/159 |
| 4,525,490 | 6/1985 | Smith | 521/124 |
| 4,559,366 | 12/1985 | Hostettler | 521/51 |
| 4,670,346 | 6/1987 | Smith | 428/422.8 |
| 4,797,226 | 1/1989 | Hostettler | 252/182.2 |
| 4,837,245 | 6/1989 | Streu et al. | 521/117 |
| 5,300,532 | 4/1994 | Takimoto et al. | 521/51 |

FOREIGN PATENT DOCUMENTS

| | | |
|---|---|---|
| 5508390 | 11/1990 | Australia . |
| 2044526 | 12/1991 | Canada . |
| 0026915 | 4/1981 | European Pat. Off. . |
| 0358328 | 3/1990 | European Pat. Off. . |
| 0393903 | 10/1990 | European Pat. Off. . |
| 85/04410 | 10/1985 | WIPO . |

*Primary Examiner*—Duc Truong

[57] ABSTRACT

Reaction system for preparing microcellular elastomers comprising an isocyanate-terminated prepolymer, a polyol and water.

27 Claims, No Drawings

REACTION SYSTEM FOR PREPARING MICROCELLULAR ELASTOMERS

CROSS REFERENCE TO RELATED APPLICATIONS

This application is a continuation of application Ser. No. 08/093,245, filed Jul. 16, 1993, now abandoned.

The present invention is concerned with a reaction system for preparing microcellular elastomers, particularly shoe soles having a very low density (200–350 Kg/m$^3$).

Reaction systems for the preparation of microcellular elastomers have already been described in the prior art.

EP-A 358328 discloses prepolymer compositions comprising a polyester prepolymer and a polyether prepolymer, suitable for preparing microcellular elastomers.

In U.S. Pat. No. 4,559,366 microcellular PU elastomers having a specific gravity between approximately 400 and 700 Kg/m$^3$ are disclosed. They are prepared by reacting a quasi-prepolymer, a polyether polyol, a chain extender and a halogenated blowing agent. Although some water may be present as secondary blowing agent it is preferred that blowing is effected in the absence of water.

U.S. Pat. No. 4,374,210 describes the preparation of elastomers from an isocyanate prepolymer and a specified aromatic diamine.

U.S. Pat. No. 4,190,711 describes the preparation of thermoplastic elastomers from a prepolymer, a polyol and a diol chain extender. Only solid elastomers have been exemplified.

Surprisingly it has now been found that microcellular elastomers of even lower density (200–350 Kg/m$^3$) can be prepared by reacting polyether prepolymers based on a specified class of polyether polyols, with a polyol in the presence of water as blowing agent.

Therefore the present invention is concerned with a reaction system comprising 1) a polyisocyanate composition having a free NCO-value of 15–25% by weight and comprising an isocyanate-terminated prepolymer which is the reaction product of an excess of an organic polyisocyanate and a polyether polyol having an average nominal hydroxyl functionality of 2–6, a number average molecular weight of 2000–6000 and an ethylene oxide content of 20–35% by weight, at least 50% of the ethylene oxide groups being present at the end of the polyether polyol;
2) a polyol; and
3) water.

Further the invention is concerned with a process for preparing a microcellular elastomer by reacting the above ingredients, with moulded articles obtainable from the above reaction system and with the above polyisocyanate composition.

The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

The term "polyisocyanate composition" in the present patent application is to be construed as including prepolymer and free polyisocyanate. Such free polyisocyanate may have been added to the prepolymer as well, provided the free NCO value of the polyisocyanate composition remains at a level as indicated hereinbefore.

The term "reaction system" refers to a combination of ingredients wherein the polyisocyanate composition is kept in a container separate from the isocyanate-reactive ingredients.

Organic polyisocyanates which may be used in the preparation of the polyisocyanate compositions of the invention include aliphatic, cycloaliphatic and araliphatic polyisocyanates, for example hexamethylene diisocyanate, isophorone diisocyanate, cyclohexane-1,4-diisocyanate, dicyclo-hexylmethane-4,4-diisocyanate an p-xylylene diisocyanate.

The preferred polyisocyanates, however, are the aromatic polyisocyanates, for example phenylene diisocyanates, tolylene diisocyanates, 1,5-naphthylene diisocyanate and especially the available diphenylmethane diisocyanate (MDI) based polyisocyanates like MDI isomers, that is to say 4,4'-diphenyl-methane diisocyanate, 2,4'-diphenylmethane diisocyanate and mixtures thereof and polymeric MDI having an isocyanate functionality of more than 2. Whilst diisocyanates are the preferred polyisocyanates for use in the preparation of the polyisocyanate compositions, mixtures of diisocyanates with minor proportions of higher functionality polyisocyanates may be used if desired.

Other MDI variants are well known in the art and include liquid products obtained by the introduction of urethane, allophanate, urea, biuret, carbodiimide, uretonimine and/or isocyanurate residues.

The polyether polyols used fore preparing the prepolymer contain 20–35% by weight ethylene oxide groups; at least 50%, and preferably at least 75% of these ethylene oxide groups are present at the end of the polyether polyol (tipped).

These polyether polyols have an average nominal functionality of 2–6, preferably of 2–4. They have a number average molecular weight of 2000–6000 and preferably 2000–5000 and most preferably of 3000–5000.

Polyether polyols which may be used for preparing the isocyanate-terminated prepolymer include products obtained by the polymerisation of ethylene oxide with another cyclic oxide, for example propylene oxide or tetrahydrofuran in the presence of polyfunctional initiators. Suitable initiator compounds contain a plurality of active hydrogen atoms and include water and polyols, for example ethylene glycol, propylene glycol, diethylene glycol, dipropylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include poly(oxyethylene-oxypropylene) diols and triols obtained by the sequential addition of propylene and ethylene oxides to di- or trifunctional initiators as fully described in the prior art. Mixtures of the said diols and triols can be useful as well. Other useful polyether polyols include polytetramethylene glycols obtained by the polymerisation of tetrahydrofuran.

The isocyanate-terminated prepolymer is prepared by reaction of an excessive amount of the polyisocyanate and the polyether polyol in order to obtain a prepolymer having the indicated NCO value. Methods to prepare prepolymers have been described in the art. The relative amounts of polyisocyanate and polyether polyol depend on their equivalent weights and on the desired NCO value and can be determined easily by those skilled in the art. If desired, the reaction may be conducted in the presence of catalysts which enhance the formation of urethane groups, like tertiary amines and tin compounds. In general the reaction time is between 30 minutes and 4 hours and the temperature between 50° and 90° C.

At least 90% of the groups obtained by reacting the polyisocyanate and the polyether polyol for preparing the prepolymer are polyurethane groups. To the prepolymers so prepared a polyisocyanate may be added provided the NCO value remains in the indicated range. The amount added in general is less than 25% by weight based on the total polyisocyanate composition. The added polyisocyanate may be selected from those mentioned above. Aromatic polyisocyanates and in particular MDI based polyisocyanates are preferred.

The polyol used for reacting with the isocyanate-terminated prepolymer may have a number average molecular weight of 500 to 10000, preferably 750–6000, and an average nominal functionality of 2–6, and may be selected from polyesters, polyesteramides, polythioethers, polycarbonates, polyacetals, polyolefins, polysiloxanes and polyethers. Preferred are polyester polyols having an average nominal functionality of 2–4, especially those having a number average molecular weight of 750–4000 and an average nominal functionality of 2–3, and polyether polyols having an average nominal functionality of 2–6, preferably 2.2–4 and a number average molecular weight of 1000–6000, especially 2000–6000 and mixtures thereof.

Polyether polyols which may be used include products obtained by the polymerisation of a cyclic oxide, for example ethylene oxide, propylene oxide, butylene oxide or tetrahydrofuran in the presence, where necessary, of polyfunctional intitiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Especially useful polyether polyols include polyoxypropylene and poly(oxyethylene-oxypropylene) polyols obtained by the simultaneous or sequential addition of ethylene and propylene oxides to an intitiator as fully described in the prior art.

The polyether polyols may be of the polymer polyol type, generally known in the art.

Most preferably polyester polyols are used for reaction with the polyisocyanate composition.

Polyester polyols which may be used include hydroxyl-terminated, reaction products of polyhydric alcohols such as ethylene glycol, propylene glycol, diethylene glycol, dipropylene glycol, 1,4-butanediol, bis(hydroxyethyl) terephthalate, glycerol, trimethylolpropane, hexanediol, neopentyl glycol, methylpentane diol, pentaerythritol or polyether polyols or mixtures of such polyhydric alcohols, and polycarboxylic acids, especially dicarboxylic acids or their ester-forming derivatives, for examples succinic, glutaric and adipic acids or their dimethyl esters, sebacic acid, phthalic anhydride, tetrachlorophthalic anhydride or dimethyl terephthalate or mixtures thereof.

Preferred polyester polyols have a number average molecular weight of 750–4000, especially 750–2500, and an average nominal functionality of 2–3.

The amount of water used as foaming agent, preferably in the absence of other blowing agents, may be varied in known manner in order to achieve the desired density.

Suitable amounts of water are generally at least 0.3 parts by weight, preferably from 0.3 to 1.2 parts by weight, per 100 parts of the reaction system. Preferably water is the sole blowing agent.

The reaction system further may comprise conventional additives like catalysts, surfactants, colorants, stabilisers, fillers and chain extenders and cross-linkers. The chain extenders and cross-linkers are polyols having an hydroxyl functionality of 2–6 and preferably 2–4 and a molecular weight of 62–499, like ethylene glycol, diethylene glycol, propylene glycol, dipropylene glycol, butane diol, glycerol, trimethylolpropane, hexanediol, pentaerythritol and polyethylene glycols of MW of 499 and less. The amount of chain extenders and cross-linker is at most 30 parts by weight per 100 parts by weight of polyol used to react with the polyisocyanate composition. Conventionally the polyol, the water and the additives are premixed and then reacted with the polyisocyanate composition.

The formulations of the invention are processed at an isocyanate index between 0.85 and 1.15, preferably 0.90 and 1.10, most preferably between 0.95 and 1.05.

Microcellular elastomers, widely used for shoe soling, made using these reaction systems exhibit excellent properties. Further these reaction systems may be used to make water-blown integral skin foams like steering wheels, arm- and head-rests and dashboards.

Microcellular elastomers having a very low density, i.e. 200–350 Kg/m, appeared to show physical properties which are comparable to conventional microcellular elastomers having a higher density. The integral skin foams are prepared in the conventional way.

The invention is illustrated by means of the following examples.

EXAMPLES

The experiments were run on a calibrated EMB F20 ST pouring machine.

The polyol blend was well homogenised and kept at a temperature of 35°–50° C. The temperature of the prepolymer was 25°–45° C. Mouldings were produced at an index of 95–105.

The materials used are

* Suprasec MPR polyisocyanate: pure 4,4'-MDI (commercially available from Imperial Chemical Industries PLC; Suprasec is a Trademark of ICI PLC)
* Suprasec VM20 polyisocyanate: uretonimine modified MDI (commercially available from Imperial Chemical Industries PLC)
* PBA 5181: polyether polyol containing 27% EO (all tipped); MW=3750; average nominal hydroxyl functionality=2; (available from Imperial Chemical Industries PLC)
* Daltorez TA 20 polyester polyol: MW=2000; average nominal hydroxyl functionality=2; (commercially available from Imperial Chemical Industries PLC; Daltorez is a trademark of ICI PLC)
* PBA 1657: polyether polyol containing 16% EO (all tipped); MW 3750; average nominal hydroxyl functionality=2; (commercially available from Imperial Chemical Industries PLC)
* Daltorez 2360 polyester polyol: MW=2750; average nominal hydroxyl functionality=2.7; (commercially available from Imperial Chemical Industries PLC)
* Daltorez 1620: a polyester polyol having a molecular weight of 2000 and an average nominal hydroxyl functionality of 2;

* 494/792/2: is a surfactant obtainable from MÜNCH Chemie Labor GmbH.
* DABCO EG: 33% solution of 1,4-diazo-bicyclo[2,2,2]octane (triethylene diamine) in ethylene glycol (commercially available from Air Products & Chemicals Inc.)
* PBA 2563: UV stabiliser package (commercially available from Imperial Chemical Industries PLC)
* W.P. 5711–109: White Pigment
* Arcton 113: 1,1,2-trichloro trifluoroethane (commercially available from Imperial Chemical Industries PLC; Arcton is a Trade Mark of ICI PLC)
* Daltocel T 32–75 polyether polyol: 15% EO-tipped polyether polyol; fn=3; MW=5260 (commercially available from Imperial Chemical Industries PLC; Daltocel is a Trade Mark of ICI PLC)
* DC 193: a surfactant from Air Products;
* Tegosioxine 3: surfactant from Goldschmidt.

Example 1

In this example an elastomer according to the invention (using prepolymer A) is compared with an elastomer made from a prepolymer based on a 50/50 blend of a polyether polyol and a polyester polyol (prepolymer B). The prepolymers were prepared by reacting Suprasec MPR with the indicated polyol at 80° C. for 3 hours and subsequently adding Suprasec VM 20.

The formulations; processing conditions and properties were as follows:

| prepolymer | A | B |
| --- | --- | --- |
| suprasec MPR | 54.3 | 55.35 |
| suprasec VM20 | 6.0 | 6.0 |
| PBA 5181 | 39.7 | 19.3 |
| Daltorez TA20 | 0.0 | 19.3 |
| NCO value | 19.1 | 19.1 |
| polyol blend | | |
| Daltorez TA20 | 78.3 | 78.3 |
| ethylene glycol | 11.0 | 11.0 |
| dabco EG | 1.5 | 1.5 |
| water | 1.2 | 1.2 |
| PBA 2563 | 3.0 | 3.0 |
| W.P. 5711-109 | 5.0 | 5.0 |
| processing | | |
| mixing ratio | 1.31 | 1.31 |
| Isocyanate/Polyol blend | 11 | 11 |
| cream time (sec) | | |
| tack free time (sec) | 22 | 22 |
| end of rise (sec) | 42 | 42 |
| pinch time (sec) | 90 | 75 |
| demould time (sec) | 300 | 240 |
| mouldings | wedge | wedge |
| overall density (Kg/m$^3$) | 290 | 290 |
| skin quality | no visual defects | no visual defects |
| dimensional stability | stable | shrinkage |

A stable microcellular elastomer from a prepolymer based on a blend of a polyether polyol and a polyester polyol could not be made at this density due to dimensional instability and shrinkage.

Example 2

In this example an elastomer according to the invention (using prepolymer A) is compared with an elastomer made from a prepolymer based on a polyether polyol containing 16% EO end-groups (prepolymer C). The prepolymers were prepared as in Example 1. The formulations, processing conditions and properties were as follows:

| prepolymer | A | C |
| --- | --- | --- |
| suprasec MPR | 54.3 | 55.35 |
| suprasec VM20 | 6.0 | 6.0 |
| PBA 5181 | 39.7 | 0.0 |
| PBA 1657 | 0.0 | 39.7 |
| NCO value | 19.1 | 19.1 |
| polyol blend | | |
| Daltorez TA20 | 78.6 | 78.6 |
| ethylene glycol | 11.0 | 11.0 |
| dabco EG | 1.5 | 1.5 |
| water | 0.9 | 0.9 |
| PBA 2563 | 3.0 | 3.0 |
| W.P 5711-109 | 5.0 | 5.0 |
| processing | | |
| mixing ratio | 1.31 | 1.31 |
| Isocyanate/Polyol blend | 11 | 11 |
| cream time (sec) | | |
| gel time (sec) | 22 | 22 |
| tack free time (sec) | 27 | 27 |
| end of rise (sec) | 45 | 45 |
| pinch time (sec) | 80 | 85 |
| demould time (sec) | 270 | 285 |
| mouldings | wedge | wedge |
| overall density (Kg/m$^3$) | 300 | 300 |
| skin quality | no visual defects | skin pealing rough skin |
| dimensional stability | stable | partial collaps |

The prepolymer C based elastomer shows unsatisfactory skin quality and dimensional stability.

Example 3

Elastomers according to the invention are compared with an elastomer prepared using a halocarbon in addition to water. The prepolymers were prepared as in example 1. The formulations, processing conditions and properties were as follows:

| prepolymer | A | A | A |
| --- | --- | --- | --- |
| polyol blend | | | |
| Daltorez 1620 | — | — | 20.0 |
| Daltorez TA20 | 58.4 | 52.4 | 50.35 |
| Daltorez 2360 | 20.0 | 20.0 | 10.0 |
| ethylene glycol | 10.0 | 10.0 | 10.0 |
| dabco EG | 1.8 | 1.8 | 1.5 |
| water | 1.5 | 0.9 | 1.5 |
| PBA 2563 | 3.0 | 3.0 | 3.0 |
| W.P. 5711-109 | 5.0 | 5.0 | 3.0 |
| Arcton 113 | — | 7.0 | — |
| 494/792/2 | 0.3 | 0.3 | 0.3 |
| DC 193 | 0.2 | — | 0.2 |
| Tegosioxine 3 | — | — | 0.15 |
| processing | | | |
| mixing ratio | 1.33 | 1.17 | 1.33 |
| Isocyanate/Polyol blend | 9 | 10 | 10 |
| cream time (sec) | | | |
| gel time (sec) | 18 | 19 | 20 |
| tack free time (sec) | 30 | 25 | 28 |
| end of rise (sec) | 32 | 28 | 30 |
| pinch time (sec) | 135 | 65 | 70 |
| mouldings | wedge | wedge | wedge |

-continued

| prepolymer | A | A | A |
|---|---|---|---|
| overall density (Kg/m³) | 270 | 270 | 270 |
| skin quality | no visual defects | no visual defects | no visual defects |
| dimensional stability | stable | stable | stable |

Using water alone as the blowing agent does not result in an elastomer of inferior quality.

Example 4

Three elastomers were prepared using a polyether polyol in the polyol component. One elastomer was made using water and a polyol having a nominal functionality of 3, the second was made using a halocarbon as the main blowing agent and the third was made from a polyol having a nominal functionality of 2. The prepolymers were prepared as in Example 1. The formulations, processing conditions and properties are as follows:

| TEST | 1 | 2 | 3 |
|---|---|---|---|
| prepolymer | A | A | A |
| polyol blend | | | |
| pba 5181 | — | — | 85.8 |
| Daltocel T32-75 | 85.8 | 85.8 | — |
| ethylene glycol | 10.0 | 10.0 | 10.0 |
| dabco EG | 2.2 | 2.2 | 2.2 |
| glycerol | 0.5 | 0.5 | 0.5 |
| water | 1.5 | 0.9 | 1.5 |
| Arcton 113 | — | 7.0 | — |
| processing | | | |
| mixing ratio | 1.32 | 1.17 | 1.32 |
| Isocyanate/Polyol blend | 11 | 11 | 8/9 |
| cream time (sec) | | | |
| tack free time (sec) | 27 | 28 | 30 |
| end of rise (sec) | 31 | 32 | 28 |
| pinch time (sec) | 240 | 170 | 280 |
| demould time (sec) | 420 | 400 | 700 |
| mouldings | wedge | wedge | wedge |
| overall density (Kg/m³) | 280 | 270 | 280 |
| skin quality | some pinholes | some pinholes | some pinholes |
| dimensional stability | stable | stable | stable |

Unlike elastomers made from polyester polyols (preferred in this invention), the above polyether polyol-based elastomers do not have a perfect skin quality, but are still acceptable. The use of polyether polyols having an average nominal functionality of 2.2 or more in the polyol blend is preferred since the demould time of reaction systems using polyether polyols having an average nominal functionality of 2 is considerably longer (test 3).

We claim:

1. A reaction system comprising:
   (1) a polyisocyanate composition having a free NCO-value of 15–25% by weight comprising an isocyanate-terminated prepolymer which is the reaction product of an excess of an organic polyisocyanate and a polyether polyol having an average nominal hydroxyl functionality of 2–4, a number average molecular weight of 3000–5000 and an ethylene oxide content of 20–35% by weight, wherein at least 50% of the ethylene oxide groups are present at the end of the polyether polyol;
   (2) a polyol selected from the group consisting of a polyether polyol having an average nominal hydroxyl functionality of 2.2–4 and a polyester polyol; and
   (3) water.

2. A reaction system according to claim 1 characterized in that the free NCO-value of the polyisocyanate composition is 17–21% by weight.

3. A reaction system according to claim 1 characterized in that the polyol of component 2 is a polyester polyol having an average nominal hydroxyl functionality of 2–3 and a number average molecular weight of 750–4000.

4. A reaction system according to claim 1 characterized in that the polyol of component 2 is a polyether polyol having a number average molecular weight of 2000–6000.

5. A reaction system according to claim 1 characterized in that at least 75% of the ethylene oxide groups in the polyether polyol in component 1 are present at the end of the polyether polyol.

6. A reaction system according to claim 1 characterized in that the organic polyisocyanate is a diphenylmethane diisocyanate-based polyisocyanate.

7. A reaction system according to claim 1 characterized in that the water content is 0.3–1.2 parts by weight per 100 parts by weight of the reaction system.

8. A reaction system according to claim 1 characterized in that the reaction system comprises water as the sole blowing agent.

9. A reaction system according to claim 1 characterized in that in the isocyanate-terminated prepolymer at least 90% of the groups formed by reacting the polyisocyanate and the polyether polyol are urethane groups.

10. A reaction system according to claim 1 characterized in that the system further comprises up to 30 parts by weight per 100 parts by weight of component 2 of a polyol having a hydroxyl functionality of 2–6 and a molecular weight of 62–499.

11. A reaction system comprising:
   (1) a polyisocyanate composition having a free NCO-value of 15–25% by weight comprising an isocyanate-terminated prepolymer which is the reaction product of an excess of an organic polyisocyanate and a polyether polyol having an average nominal hydroxyl functionality of 2–6, a number average molecular weight of 3000–5000 and an ethylene oxide content of 20–35% by weight, wherein at least 50% of the ethylene oxide groups are present at the end of the polyether polyol;
   (2) a polyol; and
   (3) water.

12. A reaction system comprising:
   (1) a polyisocyanate composition having a free NCO-value of 15–25% by weight comprising an isocyanate-terminated prepolymer which is the reaction product of an excess of an organic polyisocyanate and a polyether polyol having an average nominal hydroxyl functionality of 2–6, a number average molecular weight of 2000–6000 and an ethylene oxide content of 20–35% by weight, wherein at least 50% of the ethylene oxide groups are present at the end of the polyether polyol;
   (2) a polyol; and
   (3) 0.3–1.2 parts by weight of water per 100 parts by weight of reaction system, wherein water is the sole blowing agent.

13. A reaction system comprising:
   (1) a polyisocyanate composition having a free NCO-value of 15–25% by weight comprising an isocyanate-terminated prepolymer which is the reaction product of an excess of an organic polyisocyanate and a polyether polyol having an average nominal hydroxyl functionality of 2–6, a number average molecular weight of 3000–5000 and an ethylene oxide content of 20–35% by weight, wherein at least 50% of the ethylene oxide groups are present at the end of the polyether polyol;

(2) a polyol selected from the group consisting of a polyether polyol having an average nominal hydroxyl functionality of 2.2–4 and a polyester polyol; and (3) 0.3–1.2 parts by weight of water per 100 parts by weight of reaction system.

14. A reaction system comprising:

(1) a polyisocyanate composition having a free NCO-value of 17–21% by weight comprising an isocyanate-terminated prepolymer which is the reaction product of an excess of a diphenylmethane diisocyanate-based polyisocyanate and a polyether polyol having an average nominal hydroxyl functionality of 2–4, a number average molecular weight of 3000–5000 and an ethylene oxide content of 20–35% by weight, wherein at least 75% of the ethylene oxide groups are present at the end of the polyether polyol;

(2) a polyol selected from the group consisting of a polyether polyol having an average nominal functionality of 2.2–4 and a number average molecular weight of 2000–6000 and a polyester polyol having an average nominal hydroxyl functionality of 2–3 and a number average molecular weight of 750–4000; and (3) water, wherein the water content is 0.3–1.2 parts by weight per 100 parts by weight of the reaction system, the reaction system comprises water as the sole blowing agent, in the isocyanate-terminated prepolymer at least 90% of the groups formed by reacting the polyisocyanate and the polyether polyol are urethane groups and the system further comprises up to 30 parts by weight per 100 parts by weight of component 2 of a polyol having a hydroxyl functionality of 2–6 and a molecular weight of 62–499.

15. A polyisocyanate composition having a free NCO-value of 15–25% by weight comprising an isocyanate-terminated prepolymer which is the reaction product of an excess of an organic polyisocyanate and a polyether polyol having an average nominal hydroxyl functionality of 2–6, a number average molecular weight of 3000–5000 and an ethylene oxide content of 20–35% by weight, wherein at least 50% of the ethylene oxide groups are present at the end of the polyether polyol.

16. A polyisocyanate composition according to claim 15 characterized in that the free NCO-value is 17–21% by weight, the polyether polyol has an average nominal hydroxyl functionality of 2–4, at least 75% of the ethylene oxide groups are present at the end of the polyether polyol, the organic polyisocyanate used for preparing the prepolymer is a diphenylmethane diisocyanate-based polyisocyanate and, in the isocyanate-terminated prepolymer, at least 90% of the groups formed by reacting the polyisocyanate and the polyether polyol are urethane groups.

17. A method for the preparation of fully water blown microcellular elastomers comprising reacting a polyisocyanate composition according to claim 15 with an isocyanate-reactive composition under conditions suitable for forming fully water blown microcellular elastomers.

18. A method for preparing microcellular elastomers comprising reacting the reaction system according to claim 1.

19. A method for preparing microcellular elastomer comprising reacting the reaction system according to claim 11.

20. A method for preparing microcellular elastomers comprising reacting the reaction system according to claim 12.

21. A method for preparing microcellular elastomers comprising reacting the reaction system according to claim 13.

22. A method for preparing microcellular elastomers comprising reacting the reaction system according to claim 14.

23. Molded articles prepared by the process comprising reacting the reaction system according to claim 1.

24. Molded articles prepared by the process comprising reacting the reaction system according to claim 11.

25. Molded articles prepared by the process comprising reacting the reaction system according to claim 12.

26. Molded articles prepared by the process comprising reacting the reaction system according to claim 13.

27. Molded articles prepared by the process comprising reacting the reaction system according to claim 14.

* * * * *